United States Patent
Rautenberg (10) Patent No.: US 11,833,873 B2
(45) Date of Patent: Dec. 5, 2023

(54) AIR SUSPENSION STRUT HAVING A REINFORCING CORE IN THE COVER

(71) Applicant: Continental Teves AG & Co OHG, Frankfurt am Main (DE)

(72) Inventor: Kai Marcus Rautenberg, Nordstemmen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 360 days.

(21) Appl. No.: 16/886,342

(22) Filed: May 28, 2020

(65) Prior Publication Data

US 2020/0290422 A1    Sep. 17, 2020

Related U.S. Application Data

(63) Continuation of application No. PCT/EP2018/082919, filed on Nov. 29, 2018.

(30) Foreign Application Priority Data

Dec. 1, 2017  (DE) ...................... 10 2017 221 706.5
Jun. 26, 2018  (DE) ...................... 10 2018 210 406.9

(51) Int. Cl.
*B60G 15/12*  (2006.01)
*B60G 15/00*  (2006.01)

(52) U.S. Cl.
CPC ........ *B60G 15/12* (2013.01); *B60G 2202/314* (2013.01); *B60G 2204/1262* (2013.01);
(Continued)

(58) Field of Classification Search
CPC .......... F16F 9/084; F16F 9/13002; F16F 9/05; F16F 9/0472; F16F 2224/0241;
(Continued)

(56) References Cited

U.S. PATENT DOCUMENTS 4,796,870 A * 1/1989 Hoffman ................. F16F 9/084
                                                          403/267
4,946,144 A * 8/1990 Geno .................... F16F 9/0463
                                                         267/64.27
(Continued)

FOREIGN PATENT DOCUMENTS

CN        201250875 Y       6/2009
CN        101500827 A       8/2009
(Continued)

OTHER PUBLICATIONS

International Search Report and Written Opinion dated Mar. 15, 2019 from corresponding International Patent Application No. PCT/EP2018/082919.
(Continued)

*Primary Examiner* — Robert A. Siconolfi
*Assistant Examiner* — James K Hsiao (57) ABSTRACT

Air suspension strut for a motor vehicle comprising an air spring with a shock damper, wherein the air spring comprises an air spring cover and a rolling piston, wherein a rolling bellows of elastomer material is clamped in an airtight manner between the air spring cover and the rolling piston, the air spring cover comprises a damper bearing receptacle having a base and receiving a damper bearing of the shock damper, and the air spring cover comprises a clamping base to which a first end of the rolling bellows is attached, wherein the air spring cover is manufactured from a plastic material and comprises a reinforcing core in order to increase the strength of the damper bearing receptacle, the reinforcing core being arranged in the base of the damper bearing receptacle and being at least partially surrounded by the plastic material of the air spring cover.

12 Claims, 3 Drawing Sheets

(52) U.S. Cl.
CPC .............. *B60G 2204/418* (2013.01); *B60G 2206/7104* (2013.01); *B60G 2206/73* (2013.01); *B60G 2206/81012* (2013.01); *B60G 2206/8201* (2013.01)

(58) Field of Classification Search
CPC .............. B60G 2204/126; B60G 15/12; B60G 2206/7101; B60G 2204/418; B60G 2206/424; B60G 2204/1262; B60G 2202/314; B60G 2204/128; B60G 2206/73; B60G 2206/8201; B60G 2206/7104; B60G 2206/81012
See application file for complete search history.

(56) References Cited

U.S. PATENT DOCUMENTS

| | | | |
|---|---|---|---|
| 4,988,081 A | 1/1991 | Dohrmann | |
| 6,234,460 B1* | 5/2001 | Arnold | F16F 9/057 267/140 |
| 6,336,610 B1* | 1/2002 | Wode | F16F 9/084 267/64.19 |
| 6,843,472 B2* | 1/2005 | Henry, III | B60G 15/14 267/64.24 |
| 7,258,330 B2* | 8/2007 | Harms | F16F 9/38 267/64.23 |
| 7,284,644 B2* | 10/2007 | Cmich | B60G 15/12 267/293 |
| 8,376,327 B2* | 2/2013 | Lee | B60G 15/12 267/113 |
| 8,973,932 B2* | 3/2015 | Pielock | F16F 9/0463 280/124.157 |
| 9,630,471 B2* | 4/2017 | Kato | B60G 99/002 |
| 10,525,782 B2* | 1/2020 | Derr | F16F 9/54 |
| 10,703,158 B2* | 7/2020 | Pielock | F16F 9/54 |
| 2002/0011697 A1* | 1/2002 | Pesch | F16F 9/084 267/64.23 |
| 2004/0017035 A1* | 1/2004 | Treder | F16F 9/54 267/220 |
| 2004/0119212 A1* | 6/2004 | Gleu | F16F 9/05 267/64.11 |
| 2004/0222576 A1* | 11/2004 | Oldenettel | F16F 9/361 267/64.19 |
| 2005/0236749 A1* | 10/2005 | Gross | F16F 9/0454 267/122 |
| 2010/0001444 A1 | 1/2010 | Weber | |
| 2010/0104228 A1* | 4/2010 | Kaneko | F16C 17/04 384/420 |
| 2012/0153550 A1 | 6/2012 | Sigirtmac et al. | |
| 2013/0009376 A1* | 1/2013 | Kaneko | F16C 33/20 384/216 |
| 2013/0025448 A1 | 1/2013 | Nowotka | |
| 2014/0246817 A1* | 9/2014 | Bounds | B60G 15/14 29/896.9 |
| 2014/0252743 A1 | 9/2014 | Pielock | |
| 2015/0159725 A1 | 6/2015 | Gleu | |
| 2016/0023529 A1* | 1/2016 | Wilkin | F16F 1/12 267/221 |
| 2016/0108985 A1* | 4/2016 | Pniewski | F16F 9/084 267/64.27 |
| 2016/0176258 A1* | 6/2016 | Bounds | F16F 9/0454 267/64.24 |
| 2017/0219041 A1* | 8/2017 | Debruler | F16F 9/05 |
| 2018/0015800 A1* | 1/2018 | Derr | B60G 11/28 |
| 2019/0186579 A1* | 6/2019 | Jerisk | F16F 9/05 |
| 2019/0186580 A1* | 6/2019 | Pielock | F16F 9/0472 |
| 2020/0039309 A1 | 2/2020 | Pielock et al. | |
| 2020/0101808 A1* | 4/2020 | Rautenberg | B60G 15/14 |

FOREIGN PATENT DOCUMENTS

| | | |
|---|---|---|
| CN | 201827289 U | 5/2011 |
| CN | 102574437 A | 7/2012 |
| CN | 103842191 A | 6/2014 |
| CN | 104428558 A | 3/2015 |
| CN | 204488956 U | 7/2015 |
| CN | 106414120 A | 2/2017 |
| CN | 106662187 A | 5/2017 |
| DE | 10037026 C1 | 11/2001 |
| DE | 202004011432 U1 | 9/2004 |
| DE | 102004031875 A1 | 11/2005 |
| DE | 102004061989 A1 | 7/2006 |
| DE | 102009036554 A1 | 7/2010 |
| DE | 102011079986 B3 | 10/2012 |
| DE | 102012012902 A1 | 1/2013 |
| DE | 102012012995 A1 | 1/2014 |
| DE | 102013212982 A1 | 6/2014 |
| DE | 102015100281 A1 | 7/2016 |
| DE | 102016205741 A1 | 10/2017 |
| DE | 102018216992 A1 * | 4/2019 ............. B60G 11/27 |
| DE | 102018216992 A1 | 4/2019 |
| EP | 0264573 A2 | 4/1988 |
| EP | 0291720 A2 | 11/1988 |
| EP | 0976947 A2 | 2/2000 |
| EP | 1380452 A2 | 1/2004 |
| EP | 1424506 A1 | 6/2004 |
| KR | 2017006914 A | 1/2017 |
| WO | 2013052930 A2 | 4/2013 |
| WO | 2016110357 A1 | 7/2016 |

OTHER PUBLICATIONS

Search Report dated Jul. 30, 2019 from corresponding German Patent Application No. DE 10 2018 220 527.2.

Notice of Allowance dated Feb. 16, 2022 from corresponding Chinese patent application No. 201880077541.0.

Chinese Second Office Action dated Oct. 20, 2021 for the counterpart Chinese Patent Application No. 201880077541.0.

* cited by examiner

AIR SUSPENSION STRUT HAVING A REINFORCING CORE IN THE COVER

CROSS REFERENCE TO RELATED APPLICATIONS

This application is a continuation application of PCT International Application No. PCT/EP2018/082919, filed Nov. 29, 2018, which claims priority to German Patent Application Nos. DE 10 2017 221 706.5, filed Dec. 1, 2017, and DE 10 2018 210 406.9, filed Jun. 26, 2018 wherein the contents of such applications are incorporated herein by reference.

TECHNICAL BACKGROUND

An air suspension strut, as known for example from DE 10 2012 012 902 A1, is arranged between the motor vehicle chassis or a wheel carrier and the motor vehicle body. In general, the air suspension strut comprises an air spring and a shock damper. Here, the air spring performs the function of cushioning the wheel, while the shock damper damps the oscillations of the wheel and of the motor vehicle body.

The air spring substantially consists of an air spring cover, a rolling piston and a rolling bellows clamped therebetween in an airtight manner, thereby delimiting a working chamber under air pressure. The rolling bellows is enclosed by a sleeve-shaped outer guide and, during spring compression, rolls on the concentric rolling piston with the formation of a rolling fold. By way of the air spring cover, the air suspension strut is connected to the motor vehicle body by means of appropriate fastening means.

The shock damper arranged within the air spring is connected on the one hand to the wheel carrier and is supportively fastened on the other hand via a damper bearing in the air spring cover by way of its piston rod, which can dip into the damper tube. Particularly in the dynamic operation of the air suspension strut, high tensile and compressive forces act particularly on the pot-shaped bearing receptacle of the air spring cover. Since the damper bearing of the shock damper is mounted in this bearing receptacle and since at the same time the entire air suspension strut is connected via it to the body, this component has particular strength properties.

As is known, the majority of large-volume air spring covers are produced from at least two components. Here, with an integrally bonded connection of the components, use is made of an identical material, usually a metal, from which particularly the bearing receptacle is produced. Such a cover is known for example from DE 10 2013 212 982 A1.

In addition, a wide range of requirements is placed on the air spring cover of an air suspension strut. As already stated, the entire air suspension strut is attached to the motor vehicle body via the air spring cover. Furthermore, the air spring cover, as a pressure body or as a cover comprising a large air volume, constitutes a part of the spring-effective inner volume of the air spring. The air spring cover therefore also ensures a pressure-tight closure of the interior of the air spring to the outside. In addition, the rolling bellows is attached by means of clamping rings to a clamping base provided by the air spring cover. Finally, the air spring cover also makes available pressure-tight receptacles for the air connection and additional volumes.

As a connection element between air suspension strut and attachment to the chassis, high forces are channeled through the air spring cover. These forces which are channeled in and through are, on the one hand, of a static nature (carrying forces for supporting the vehicle weight) and of a dynamic nature (time-variable forces in driving operation as a result of the spring compression/spring extension state), the dynamic forces being superimposed on the static forces. Dynamic tensile and compressive forces, which are dependent on the spring rate, act on the air spring cover at the attachment point of the shock damper (damper bearing).

The forces acting on the air spring cover of an air suspension strut also arise through the internally pressurizing gas force of the spring-effective cover chamber, which gas force, as a result of the variable pressure, can be divided into static and dynamic fractions.

To achieve complete tightness of the air spring cover, it would be functionally advantageous to produce said cover as a closed sleeve made of a material or a group of materials which can be effectively connected to one another, wherein this component is not breached by other components having for example more optimal strength properties. This is because such a breach has in turn to be sealed by particular measures. Any sealing is susceptible in terms of its pressure-tightness and additionally represents a further process step.

A composite cover made of different materials, namely plastic and metal, is known for example from DE 10 2015 100 281 A1.

What is concerned in this case is a metallic upper part which is overmolded with a thermoplastic. There is thus created a composite part which satisfies the sealing and strength requirements. Here, a flange made of a metallic material is provided for the damper bearing, via which flange the connection to the chassis is also produced. The metallic damper bearing receptacle represents a good solution in terms of the strength requirements, but is very heavy on account of its density. Therefore, the remainder of the cover sleeve of the air spring cover is also produced from a thermoplastic material in order to save weight. Here, the flange is surrounded by the thermoplastic material at least in certain areas, whereby the gas-tightness of the air spring cover is achieved.

However, a disadvantage of this solution is that, for pressure-tightness, a pressure-tight connection is required between the inner metallic flange and the pressure-tight cover sleeve facing the cover interior. This is realized at least in that the damper bearing receptacle is also overmolded on the inner side by the thermoplastic material. Said receptacle is further provided with an insert and a guide for the piston rod in order to ensure sufficient tightness. In addition, the damper bearing receptacle is closed on the upper side by a pressure-tight closure cover. All these measures are necessary on account of the stated breach.

What is needed is a way to provide an air suspension strut which overcomes said disadvantages and which fulfils as well as possible the requirements for strength and gas-tightness imposed on an air spring cover.

DETAILED DESCRIPTION OF THE EMBODIMENTS

Figure 1:
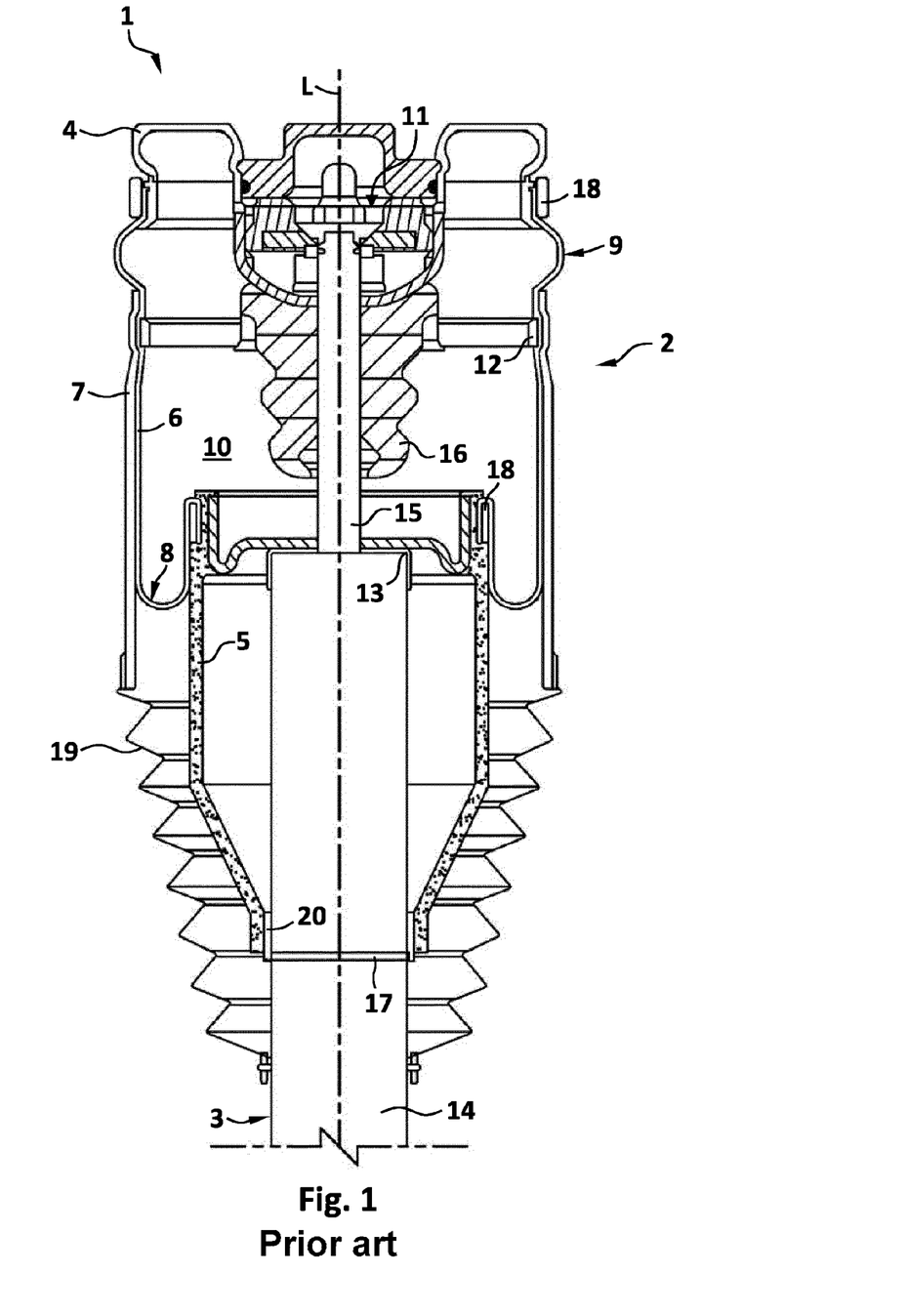
FIG. 1 shows an air suspension strut according to the prior art.

FIG. 1 shows a known air suspension strut 1 having the components, namely air spring 2 and shock damper 3, wherein the air spring 2 comprises an air spring cover 4, a rolling piston 5 and a rolling bellows 6 with an outer guide 7 which encloses it in the manner of a sleeve. The shock damper 3 is provided within the air spring 2, the shock damper 3 comprising a damper tube 14, a piston rod 15 which can dip into the latter, and a damper bearing 11.

The air suspension strut 1 satisfies two functional areas: on the one hand, the air spring 2 generates a carrying force, while the shock damper 3 is responsible for linear guidance. Fastening means on the air spring cover 4 make it possible for the air suspension strut 1 to be fastened on the one hand to a motor vehicle body and on the other hand, via a shock damper eye (not shown), to a wheel carrier of the motor vehicle chassis, with the result that the motor vehicle is sprung and damped.

This regular installed position of an air suspension strut determines the "up/down" orientation.

The air spring 2 comprises a rolling bellows 6 of elastomer material, the rolling bellows 6 delimiting, with the air spring cover 4 and rolling piston 5, an airtight, volume-elastic working chamber 10 which can be filled with compressed air. The hose-shaped rolling bellows 6 is fastened by its first end to the air spring cover 4 and by its second end to the rolling piston 5 via clamping rings 18 at the connection regions of these air spring attachment parts.

In the case of relative movements along the longitudinal axis L of the air suspension strut 1 between the air spring cover 4 and rolling piston 5, the rolling bellows 6 rolls on the concentric rolling surface of the rolling piston 5 with the formation of a rolling fold 8. Furthermore, the rolling bellows 6 forms a cardanic fold 9 on the air spring cover 4 that acts as a cardanic bearing. At the same time, the rolling bellows 6 is provided with embedded strength members.

Particularly in the case of the comfortable axial bellows, that is to say with strength members oriented in the axial direction, use is made of outer guides 7 to limit the lateral extension of the rolling bellows 6. Here, the outer guide 7 is clamped against the rolling bellows 6 by an inner locking ring 12 provided in the working chamber 10.

In order to protect the rolling fold 8 from contamination, there is provided a folding bellows 19 which is fastened, for example, to the wheel-carrier-side end region of the outer guide 7 and to the damper tube 14.

An additional spring 16 is arranged bearing against the lower side of the air spring cover 4 and facing toward the shock damper. The additional spring 16 has a through-bore for the piston rod 15 and therefore encloses the latter. During spring compression, the end side of the damper tube 14 moves toward the air spring cover 4, and therefore the additional spring 16 serves as a travel limiter and damps possible forces acting on the air spring cover 4.

The damper tube 14 of the shock damper 3 is provided within the rolling piston 5 or is surrounded by the hollow cylindrical rolling piston 5 at least in certain regions, it being possible for the rolling piston 5 to be fastened standing on the damper tube via a supporting ring 17 or hanging on the end side of the damper tube 14 via a bearing element 13. A combination of standing and hanging rolling piston 5 is also possible, as visible in the figure. It is additionally known to produce the rolling piston 5 from a light metal, such as aluminum, or a fiber-reinforced plastic.

In the case of a standing rolling piston 5, a sealing system 20, for example made of elastomer sealing rings, is provided between the piston end region facing the wheel carrier and the opposite outer wall of the damper tube 14. This serves to seal to the outside the working chamber 10, which can be expanded within the rolling piston, of the air spring 2.

Figure 2:
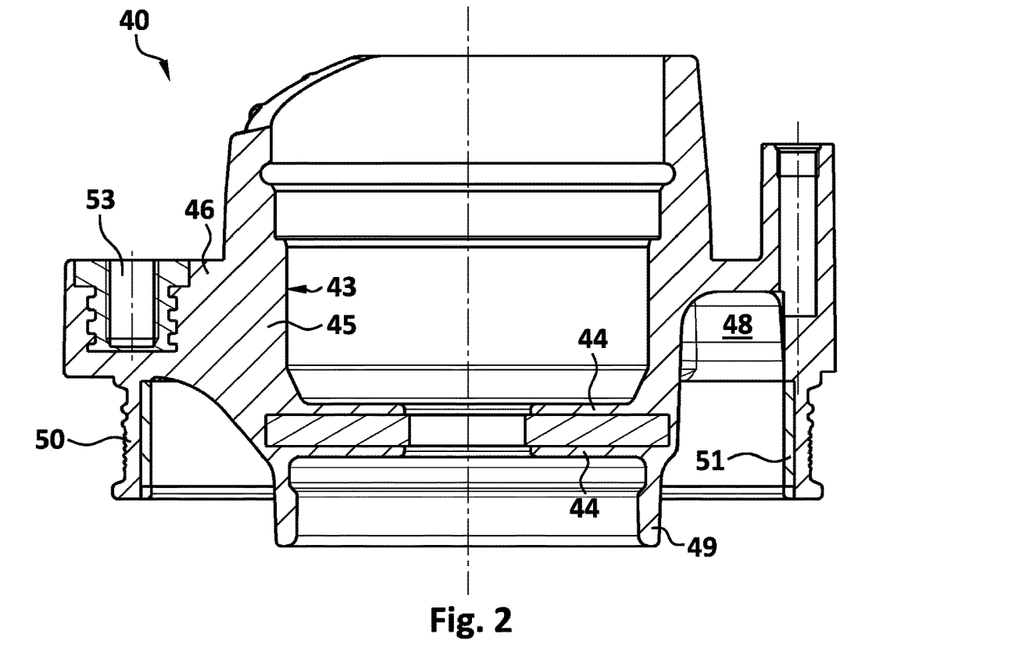
FIG. 2 shows in vertical section a first air spring cover with reinforcing core of an exemplary air suspension strut, in accordance with one or more embodiments.

FIG. 2 shows a one-piece air spring cover 40 in vertical section.

In order to meet the requirements imposed on an air spring cover 40, the latter comprises a reinforcing core 60 in the region of its damper bearing receptacle 43.

The air spring cover 40 of an exemplary air suspension strut comprises an inner pot-shaped damper bearing receptacle 43 into which the damper bearing of a shock damper is inserted. At the same time, the entire air suspension strut is attached by means of the air spring cover 40 to a motor vehicle body.

In order to mount the damper bearing, the inner pot-shaped damper bearing receptacle 43 comprises a pot base 44 with a through-bore for the shock damper piston rod. Extending from the pot base 44 is a hollow cylindrical pot wall 45 which is formed from the material of the air spring cover 40. At the upper edge of the pot wall 45, the latter merges into a radially outwardly extending pot collar 46. Finally, the pot collar 46 is extended downward and constitutes a clamping base 50 for rolling bellows attachment.

Furthermore, an additional spring pot 49, into which an additional spring is inserted, is provided on the lower side of the damper bearing receptacle 45, that is to say on the side of the pot base 44 that faces away from the attachment to the motor vehicle body.

For pressure-tight sealing of the damper bearing, the latter is closed, in the installed state, from above by a closure cover. For this purpose, annularly encircling grooves or constrictions are formed on the inner wall of the damper bearing receptacle 43 or on the inner side of the pot wall 45. The closure cover is inserted and pressed into said groove and constriction.

By virtue of the pot collar 46 extended downward to form the clamping base 50, the air spring cover 40 at least partially makes available a cover chamber 48 which, as an air chamber expansion of the working chamber of the air spring, reduces the spring stiffness of said spring.

The pot collar 46 additionally comprises receiving devices 53 for fastening means. Fastening means, or the shank and head of screw bolts, are engaged in receiving devices 53 and are overmolded by the material of the air spring cover 40 and therefore secured. Receiving devices 53 are distributed in the circumferential direction on the pot collar 46 and extend axially into said collar. The openings of the receiving device open on the axial surface of the pot collar 46. According to the example, three such receiving devices with respective fastening means are provided. The air spring cover 40 is therefore screwed to the motor vehicle body in a force-fitting manner by way of the fastening means.

The annularly encircling clamping base 50 constitutes an axial bearing surface for the attachment of the upper rolling bellows end. In a further embodiment, the clamping base 50 is reinforced on the inner side with a metallic reinforcing ring 51.

In order to meet the force requirements on the damper bearing receptacle 43, this is supported by a reinforcing core 60. The reinforcing core 60 is inserted in the damper bearing receptacle 43, or is at least partially overmolded by the material of the first cover part 41. The reinforcing core 60 is thus embedded in the pot base 44 of the damper bearing receptacle 43 such that the upper side and lower side of the latter are at least partially surrounded by the material thereof.

Like the pot base 44, the reinforcing core 60 has a hole for the piston rod of the shock damper. Accordingly, the reinforcing core 60 may be regarded as a support disc. This allows structural conduction of the dynamic forces from the damper bearing and additional spring, from the base of the damper bearing receptacle 43 to the fastening means to the motor vehicle body. Advantageously, the reinforcing core 60 has a higher modulus of elasticity than the material of the air spring cover 40.

For example, the air spring cover 40 made from a plastic only has a reinforcement in the pot base 44 of the damper bearing receptacle 45. There is no need for reinforcement of the pot wall 45. In other words, the pot wall 45 is not reinforced by a further element. It consists merely of the plastic material of the air spring cover 40. The necessary force conduction into the fastening means 52 is achieved purely by the shape and configuration of the pot wall 45.

The material of the air spring cover 40 is sufficiently corrosion-resistant. Optionally, a thermoplastic material is used. Thus, it is also possible for different thermoplastics to be used for the air spring cover 40, in particular materials with a similar melting point but different fiber filling, e.g. PA6GF30 and PA6.6GF50. These materials are easy to weld and adapt better to the individual requirements.

As an alternative to thermoplastics, a duroplastic may be used for the air spring cover 40.

The choice of material is determined by the individual strength requirements for the respective cover part.

Figure 3:
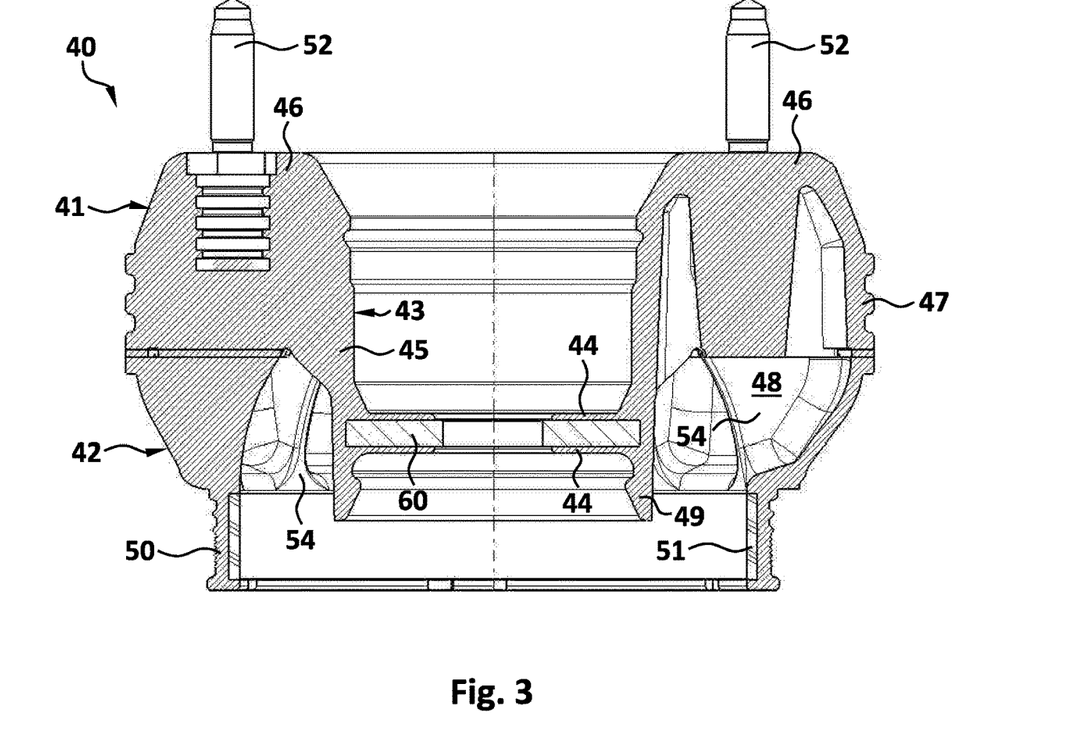
FIG. 3 shows in vertical section a second air spring cover with reinforcing core of an exemplary air suspension strut, in accordance with one or more embodiments.

FIG. 3 shows a vertical section through a multipart air spring cover 40 of an exemplary air suspension strut.

In order to meet the requirements imposed on an air spring cover 40, the latter comprises the reinforcing core 60 in the region of its damper bearing receptacle 43.

A first cover part 41 is configured to receive the shock damper bearing and also to fasten the air suspension strut to a motor vehicle body (not shown). In order to mount the damper bearing, the first cover part 41 has the inner pot-shaped damper bearing receptacle 43. This damper bearing receptacle 43, which is formed from the material of the first cover part 41, comprises a pot base 44 with a through-bore for the shock damper piston rod. Extending from the pot base 44 is a hollow cylindrical pot wall 45 which is formed from the material of the cover part 41. At the upper edge of the pot wall 45, the latter merges into a radially outwardly extending pot collar 46. The pot collar 46 also extends further into a folded outer wall 47 which is formed from the material of the first cover part 41 and forms an annular peripheral contact face for a second cover part 42. This peripheral contact face is provided on the axial underside of the outer wall 47, i.e. facing away from the connection to the vehicle body. The very shape and configuration of the outer wall 47 realize a part of the spring-effective cover volume.

In the pot collar 46, several receptacles for respective fastening means 52 are cut out of the material of the first cover part 41. Fastening means 52 or the shank of screw bolts are engaged in these receptacles, overmolded by the material of the first cover part 41 and secured. The receptacles are distributed in the circumferential direction on the pot collar 46 and extend axially into the material of the first cover part 41. The openings of the receptacles open on the axial surface of the first cover part 41 which faces the vehicle body in the fitted state. According to the example, three such receptacles with fastening means 52 are provided. By means of the screw bolts engaged in the receptacles, the entire air suspension strut is connected by force fit to the vehicle body.

Furthermore, an additional spring pot 49, which is likewise formed from the material of the first cover part 41 and into which an additional spring is inserted, is provided on the underside, i.e. on the side of the pot base 44 that faces away from the attachment to the motor vehicle body.

For pressure-tight sealing of the damper bearing, the latter is closed, in the installed state, from above by a closure cover. For this purpose, annularly encircling grooves or constrictions are formed on the inner wall of the damper bearing receptacle 43 or on the inner side of the pot wall 45. The closure cover is inserted and pressed into said groove and constriction.

Starting from the outer wall of the damper bearing receptacle 44, stiffening ribs 49 are formed in the interior of the first cover part 41, which are made from the material of said cover part and extend up to the folded outer wall 47. This plurality of broad stiffening ribs 49, which spread out in a star pattern from the damper bearing receptacle 44, serves to reinforce the latter and fulfil the strength requirements for absorption of the shock damper forces.

The outer volume structure is realized by the second cover part 42. The shape and configuration are determined and limited by the material of the second cover part 42, whereby the decisive volume of the spring-effective air spring cover 40 is realized. In addition, a second cover part 42 is provided for rolling bellows attachment and therefore comprises an annularly encircling clamping base 50 with an axial bearing surface for the upper rolling bellows end. For the purpose of improved clamping, the clamping base 50 is reinforced on the inner side by a metallic reinforcing ring 51. The reinforcing ring 51 counteracts the radial pressing force of the adjoining rolling bellows clamping and therefore supports the rolling bellows clamping with regard to its tightness requirement.

In order to meet the force requirements on the damper bearing receptacle 43, this is supported by a reinforcing core 60. The reinforcing core 60 is inserted in the damper bearing receptacle 43, or is at least partially overmolded by the material of the first cover part 41. The reinforcing core 60 is thus embedded in the pot base 44 of the damper bearing receptacle 43 such that the upper side and lower side of the latter are at least partially surrounded by the material thereof.

Like the pot base 44, the reinforcing core 60 has a hole for the piston rod of the shock damper. Accordingly, the reinforcing core 60 may be regarded as a support disc. This allows structural conduction of the dynamic forces from the damper bearing and additional spring, from the base of the damper bearing receptacle 43 to the fastening means to the motor vehicle body. Advantageously, the reinforcing core 60 has a higher modulus of elasticity than the material of the air spring cover 40.

For example, the air spring cover 40 made from a plastic only has a reinforcement in the base 44 of the damper bearing receptacle 45. There is no need for reinforcement of the pot wall 45. In other words, the pot wall 45 is not reinforced by a further element. It consists merely of the plastic material of the first cover part 41. The necessary force conduction into the fastening means 52 is achieved purely by the shape and configuration of the pot wall 45.

The material of the cover parts 41, 42 is sufficiently corrosion-resistant. Optionally, a thermoplastic material is used, wherein the same material is used for both parts 41, 42. Thus, it is also possible for different thermoplastics to be used for the cover parts 41 and 42, in particular materials with a similar melting point but different fiber filling, e.g. PA6GF30 and PA6.6GF50. These materials are easy to weld and adapt better to the individual requirements.

As an alternative to the thermoplastics, duroplastics may be used for the first and second cover parts 41, 42. Or a thermoplastic may be used for the one cover part and a duroplastic for the other cover part.

The choice of material is determined by the specific strength requirements on the respective cover part and by the joining method for connection.

It is also conceivable that a third cover part is inserted between the first and second cover parts 41, 42, if this proves suitable for economic production or for better use of installation space or for the formation of air chambers which can be shut off.

The introduction of vertically extending stiffening ribs 48 leads to an improvement in the weldability of the entire air spring cover 40. For example, the first and the second cover parts 41, 42 can be connected together gas-tightly by welding, adhesive bonding, form fit or screw fastening (the latter two options in conjunction with an O-ring seal).

Firstly, the air spring cover 40 is made of at least two parts 41, 42 is assembled in an additional joining process. Thermoplastic welding may be considered as a highly efficient joining process because, in addition to materially integral and firm joining of the part-shells, it simultaneously allows reliable and gas-tight sealing of the joining surface. If there is no adequate welding surface available, the welding between the cover parts will fail if the internal pressures are too high.

In the case of fiber-reinforced plastics, the specific strength of a welded joint is always lower than the strength of the undisturbed region of material. This is attributable to the lack of reinforcing fibers passing through the weld seam and therefore, by virtue of the principle involved, the strength of a weld seam can only be of the order of the strength of the polymeric base material.

The basic load of the internal pressure now tends to tear the upper cover part 41 vertically apart from the lower cover part 42. Therefore, the size of welded surface is decisive for the performance of the weld because it is only by way of the size of the surface that the lower specific weld seam strength can be compensated. A cover envelope without internal ribs has available as a welding surface only the annular interface of the outer contour of the cover envelope in the parting plane between the upper and the lower cover parts. As a result, the stiffening ribs 48 formed from the first and second cover parts 41, 42 represent an enlargement of the weld seam surface and increase the strength of the air spring cover 40.

Figure 4:
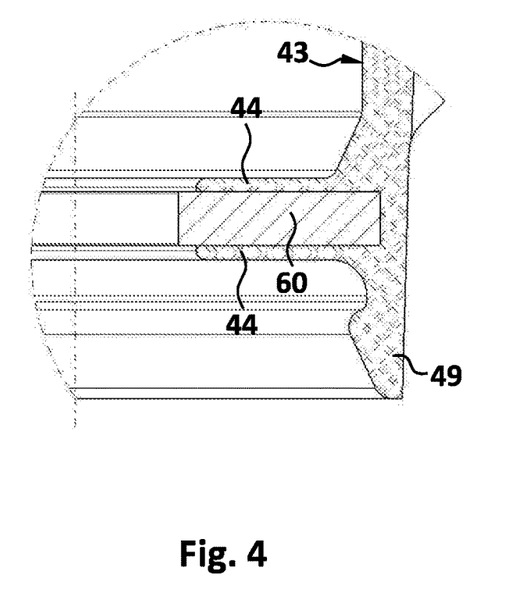
FIG. 4 shows the reinforcing core of FIG. 3 in detail, in accordance with one or more embodiments.

FIG. 4 shows again in more detail the reinforcing core 60 embedded in the base 44 of the damper bearing receptacle 43. As can be seen, the upper side and lower side of the reinforcing core 60 are at least partially surrounded by the plastic material of the air spring cover. The through-bore is not overmolded.

Figure 5:
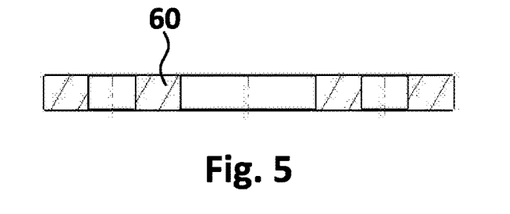
FIG. 5 shows the reinforcing core of FIG. 3 in a vertical section, in accordance with one or more embodiments.
Figure 6:
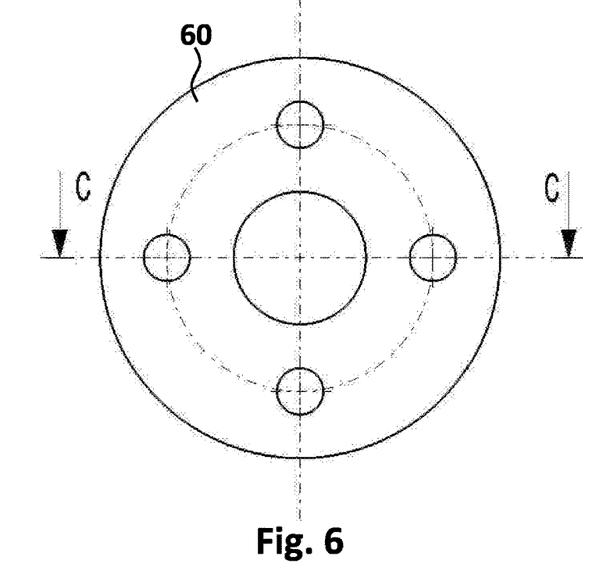
FIG. 6 shows the reinforcing core in a top view.

FIGS. 5 and 6 show that, as well as the central through-bore for the piston rod, further bores are provided in the reinforcing core 60. These bores are distributed around the circumferential direction of the reinforcing core 60 and also made axially. They serve to position the reinforcing core 60 securely in the pot base 44 since they are filled by the plastic material of the pot base 44. Accordingly, twisting of the reinforcing core 60 is eliminated.

According to one or more embodiments, an air suspension strut for a motor vehicle is provided which comprises an air spring with a shock damper for the springing and damping of oscillations of a motor vehicle chassis, wherein the air spring comprises an air spring cover and a rolling piston, wherein a rolling bellows of elastomer material is clamped in an airtight manner between the air spring cover and the rolling piston, wherein the air spring cover comprises a damper bearing receptacle having a base and receiving a damper bearing of the shock damper, and wherein the air spring cover comprises a clamping base to which a first end of the rolling bellows is attached, wherein the air spring cover is manufactured from a plastic material and comprises a reinforcing core in order to increase the strength of the damper bearing receptacle, said reinforcing core being arranged in the base of the damper bearing receptacle and being at least partially surrounded by the plastic material of the air spring cover.

When reaching the maximum compression travel of the air suspension strut, very high compression forces act on the air spring cover. The path of these forces runs from the shock damper via the additional spring into the base of the damper bearing receptacle, and via the air spring cover into the air suspension strut fixing in the vehicle strut dome on the chassis. In order to be able to absorb these high forces in the air spring cover and channel them further, the region of the transition of the damper bearing receptacle to the fixing elements on the chassis and the region of the additional spring receptacle is designed to be robust.

For this, the reinforcing core in the base of the damper receiving receptacle is proposed. The function of this core, loaded for tension and compression, is to conduct the compression forces from the additional spring and the tension forces from the damper bearing into the plastic cover in as purely axial a movement is possible. These axial forces are tolerated relatively well by the plastic material. The reinforcing core prevents the damper bearing pot base from beginning to bend under the surface loading. Thus the damper bearing receptacle, loaded for tension and compression, is supported by the reinforcing core in order to increase its strength.

The damper bearing receptacle is optionally pot-shaped. The pot shape is distinguished at least by the base and by a hollow cylindrical wall. It is ideally suited for accommodating the damper bearing and can be effectively produced by plastic injection-molding methods. The base of the damper bearing receptacle has a through-bore for the piston rod of the shock damper.

According to one or more embodiments, the air spring cover comprises a plurality of receiving devices and a plurality of fastening means for attaching the air suspension strut to the motor vehicle, wherein one of the fastening means is at least partially engaged in a respective one of the receiving devices.

In order to connect the air suspension strut to a connection region which is provided for this purpose on the motor vehicle body, a plurality of receiving devices and fastening means are provided on the axial upper side of the air spring cover. The fastening means, for example as screw bolts, comprise a shank with a head or anchor. The head or anchor is engaged in a receiving device provided in the air spring cover. The receiving devices are recesses which extend axially into the air spring cover. Since the air spring cover is injection-molded from a plastic material, the head or anchor of the fastening means is overmolded in the respective receiving devices by this plastic material, with the result that said fastening means are held securely in the receiving devices. The upper side of the air spring cover is configured as a ring inside which is the pot-like damper bearing. The receiving devices are distributed in the circumferential direction on the annular upper side of the air spring cover.

The air spring cover thus constitutes, by way of its damper bearing receptacle formed from plastic material and by way of the receiving devices, the definitive force path into the motor vehicle body for the tensile and compressive forces emanating from the shock damper.

According to one or more embodiments, the reinforcing core on the top and bottom is at least partially surrounded by the plastic material of the air spring cover.

This manner of overmolding the reinforcing core means that the forces emanating from the shock damper are widely distributed between the base of the damper bearing receptacle and the reinforcing core in order to achieve an advantageous surface pressure.

According to one or more embodiments, the reinforcing core is made of a metallic material or ceramic or another plastic material. The material choice and dimensioning of the reinforcing insert is determined according to the force requirement.

Optionally, the plastic material of the reinforcing core is a thermoplastic or duroplastic material. In particular, high-strength plastics are perfectly suited for use as a reinforcement insert since they can be easily molded and are light in weight with high strength.

According to one or more embodiments, the material of the reinforcing core has a higher modulus of elasticity than the plastic material of the air spring cover. The insertion of a core made of a material with a higher modulus of elasticity than the plastic material of the air spring cover can better prevent any bending of the base.

According to one or more embodiments, the reinforcing core has a central through-bore for a piston rod of the shock damper.

According to one or more embodiments, the reinforcing core has eccentric bores. The plastic material of the air spring cover flows into these bores made axially in the circumferential direction. This creates protection against twisting of the reinforcing core in the base.

According to one or more embodiments, the reinforcing core is a support disc. The reinforcing core constitutes a support disc or insert in the base of the damper bearing receptacle and could be regarded as being embedded therein.

According to one or more embodiments, the damper bearing receptacle has a wall which is formed from the plastic material of the air spring cover and is not reinforced by an element. To support the strength of the air spring cover, it is sufficient for the base of the damper bearing receptacle to be reinforced with the core. No further inserts or elements for reinforcing the damper bearing receptacle are required.

According to one or more embodiments, the plastic material of the air spring cover is a thermoplastic or duroplastic material. Because the air spring cover is made from a thermoplastic or duroplastic material, its geometry is simple to produce and adequate gas-tightness is ensured.

According to one or more embodiments, the air spring cover is produced in one piece and completely from the plastic material. The air spring cover made completely from the plastic material allows the production of the damper bearing receptacle which would normally be made from a metallic material. In this design, the air spring cover comprises no breach of its inner structure for force absorption and of its outer structure for rolling bellows clamping. There is thus no need for separate sealing measures, such as the provision of sealing rings or overmolding of the damper bearing receptacle.

According to another embodiment, the air spring cover is of multipart configuration, at least comprising a first cover part which comprises the damper bearing receptacle, and a second cover part which comprises the clamping base, wherein at least the first cover part is produced from the plastic material. Depending on the requirements placed on the volume of the spring cover that is to be encompassed, said cover is of two-part design. Whereas the first cover part constitutes the damper bearing receptacle, the second cover part forms a volume-encompassing cover or a sleeve which delimits the spring-effective cover chamber. The division into two cover parts increases the design freedom that is required to make available a large cover chamber.

Optionally, the second cover part is made from a thermoplastic or duroplastic material or a metallic material. Here too, a thermoplastic or duroplastic material is particularly suitable since it is easiest to form and shape by injection molding, and also saves weight thanks to its low material density. Optionally, the first and the second cover parts are connected to one another by substance bonding.

Optionally, a ribbed structure having a plurality of stiffening ribs is provided within the air spring cover. The ribbed structure is formed inside the air spring cover by way of the plurality of stiffening ribs which are provided between the outer side of the damper bearing receptacle and the inner side of the cover sleeve and connect them. The ribbed structure increases the overall strength of the air spring cover, in particular bursting as a result of the internal gas pressure is avoided.

The stiffening ribs are optionally formed from the plastic material of the air spring cover. It is at this point that the advantages of the plastic injection molding method come to the fore, since it allows a wide variety of ribbed structures to be formed from the same material as the air spring cover in one process. Also, the stiffening ribs in this two-piece air spring cover enlarge the joining region of the first cover part to the second cover part. When both cover parts are made from a plastic, these are welded together in their annular peripheral joining region. Since the stiffening ribs are also made of the plastic material of the two cover parts, these enlarge the joining region, whereby the connection strength of the two cover parts is increased.

Optionally, the clamping base is provided on the inner side with a metallic reinforcing ring. The rolling bellows is attached on its end side to the clamping base. In other words, an end portion of the upper rolling bellows end is in surface contact with the axial bearing surface of the clamping base and is fastened thereto by a clamping or locking ring. Depending on the requirement, a metallic ring is placed on the inner side of the clamping base in order to reinforce it.

The rolling bellows delimits, with the air spring cover and the rolling piston, a working chamber which is filled with compressed air. This volume-elastic working chamber represents the spring-effective volume of the air spring.

The air spring cover optionally comprises a cover chamber. This cover chamber, optionally as a large-volume air chamber, expands the working chamber of the air spring and thus reduces the spring stiffness thereof.

The air suspension strut is used in a chassis, optionally in an air spring system, for a motor vehicle.

LIST OF REFERENCE SIGNS

1 Air suspension strut
2 Air spring

3 Shock damper
4 Air spring cover
5 Rolling piston
6 Rolling bellows
7 Outer guide
8 Rolling fold
9 Cardanic fold
10 Working chamber
11 Damper bearing
12 Inner locking ring
13 Bearing element
14 Damper tube
15 Piston rod
16 Additional spring
17 Support ring
18 Clamping ring
19 Folding bellows
20 Sealing system
40 Air spring cover
41 First cover part
42 Second cover part
43 Damper bearing receptacle
44 Pot base
45 Pot wall
46 Pot collar
47 Outer wall
48 Cover space
49 Additional spring pot
50 Clamping base
51 Reinforcing ring
52 Fastening means
53 Receiving device
54 Reinforcing ribs
60 Reinforcing core
L Longitudinal axis

The invention claimed is:

1. An air suspension strut for a motor vehicle, comprising:
an air spring with a shock damper for the springing and damping of oscillations of a motor vehicle chassis,
the air spring comprises an air spring cover and a rolling piston;
a rolling bellows of elastomer material is clamped in an airtight manner between the air spring cover and the rolling piston;
the air spring cover comprises a damper bearing receptacle having a base and receiving a damper bearing of the shock damper;
the air spring cover comprises a clamping base to which a first end of the rolling bellows is attached; and
the air spring cover is manufactured from a plastic material and comprises a reinforcing core in order to increase the strength of the damper bearing receptacle, wherein the reinforcing core is an annular support disc arranged in the base of the damper bearing receptacle and at least partially surrounded by the plastic material of the air spring cover; and
wherein the air spring cover comprises a plurality of receiving devices and a plurality of fastenings for attaching the air suspension strut to the motor vehicle, wherein one of the fasteners is at least partially engaged in a respective one of the receiving devices.

2. The air suspension strut as claimed in claim 1, wherein the reinforcing core on the top and bottom is at least partially surrounded by the plastic material of the air spring cover.

3. The air suspension strut as claimed in claim 1, wherein the reinforcing core is made of a metallic material or ceramic, or a plastic material.

4. The air suspension strut as claimed in claim 3, wherein the plastic material of the reinforcing core is a thermoplastic or duroplastic material.

5. The air suspension strut as claimed in claim 1, wherein the material of the reinforcing core has a higher modulus of elasticity than the plastic material of the air spring cover.

6. The air suspension strut as claimed in claim 1, wherein the reinforcing core has a central passage bore for the piston rod of the shock damper.

7. The air suspension strut as claimed in claim 1, wherein the reinforcing core comprises eccentric bores.

8. The air suspension strut as claimed in claim 1, wherein the damper bearing receptacle has a wall made from the plastic material of the air spring cover and is not reinforced by an element.

9. The air suspension strut as claimed in claim 1, wherein the plastic material of the air spring cover is a thermoplastic or duroplastic material.

10. The air suspension strut as claimed in claim 1, wherein the air spring cover is produced in one piece and completely from the plastic material.

11. The air suspension strut as claimed in claim 1, wherein the air spring cover is of multipart configuration, at least comprising a first cover part which comprises the damper bearing receptacle, and a second cover part which comprises the clamping base, wherein at least the first cover part is produced from the plastic material.

12. The air suspension strut as claimed in claim 11, wherein the second cover part is made from a thermoplastic or duroplastic material or a metallic material.

* * * * *